US012657935B2

(12) United States Patent
Sultan et al.

(10) Patent No.: US 12,657,935 B2
(45) Date of Patent: Jun. 16, 2026

(54) METHOD FOR RECOGNIZING HORIZONTAL ROAD MARKINGS

(71) Applicant: Robert Bosch GmbH, Stuttgart (DE)

(72) Inventors: Azhar Sultan, Tunbridge Wells (GB); Joel Janai, Leonberg (DE); Tamas Kapelner, Hildesheim (DE); Thomas Wenzel, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 337 days.

(21) Appl. No.: 18/417,209

(22) Filed: Jan. 19, 2024

(65) Prior Publication Data

US 2024/0249535 A1 Jul. 25, 2024

(30) Foreign Application Priority Data

Jan. 25, 2023 (DE) ...................... 10 2023 200 575.1

(51) Int. Cl.
*G06V 20/56* (2022.01)
*G06N 3/045* (2023.01)
(Continued)

(52) U.S. Cl.
CPC ............ *G06V 20/588* (2022.01); *G06V 10/26* (2022.01); *G06V 10/774* (2022.01); *G06V 10/776* (2022.01); *G06V 10/82* (2022.01)

(58) Field of Classification Search
CPC .... G06V 20/588; G06V 10/26; G06V 10/774; G06V 10/776; G06V 10/82;
(Continued)

(56) References Cited

U.S. PATENT DOCUMENTS 12,330,639 B1 * 6/2025 Ferencz ................ B60W 10/20
2021/0374437 A1 * 12/2021 Liang ................... G06V 20/588
(Continued)

FOREIGN PATENT DOCUMENTS

DE 102004057188 A1 6/2005
EP 3410398 A1 12/2018

OTHER PUBLICATIONS

Su et al. "Structure Guided Lane Detection." arXiv (2015); pp. 1-13.
(Continued)

*Primary Examiner* — Gregory A Morse
*Assistant Examiner* — Ronde Lee Miller
(74) *Attorney, Agent, or Firm* — NORTON ROSE FULBRIGHT US LLP

(57) ABSTRACT

A method for recognizing horizontal road markings and determining the course thereof. The method includes the steps of capturing an image of a road, and dividing a central region of the image into a plurality of vertically superimposed cells and assigning to each cell predefined lines that are variously aligned around a horizontal direction. In a further step, at least one probability value for the presence of a road marking and displacement values of the line to the road marking are calculated for each line of each cell. The probability values and the displacement values are subsequently entered into a calculation function, and at least one line is output. The course of the horizontal road marking is determined from the at least one line and the displacement values.

10 Claims, 3 Drawing Sheets

(51) Int. Cl.
| | |
|---|---|
| *G06N 3/0464* | (2023.01) |
| *G06N 3/047* | (2023.01) |
| *G06T 7/73* | (2017.01) |
| *G06V 10/26* | (2022.01) |
| *G06V 10/764* | (2022.01) |
| *G06V 10/774* | (2022.01) |
| *G06V 10/776* | (2022.01) |
| *G06V 10/82* | (2022.01) |

(58) Field of Classification Search
CPC .... G06V 10/764; G06N 3/045; G06N 3/0464; G06N 3/047; G06T 7/73; G06T 2207/20081; G06T 2207/20084; G06T 2207/30256
See application file for complete search history.

(56)                          References Cited

U.S. PATENT DOCUMENTS

| | | | | |
|---|---|---|---|---|
| 2021/0406561 | A1* | 12/2021 | Zhou | ........................ G06T 7/73 |
| 2024/0404068 | A1* | 12/2024 | Liu | .......................... G06T 7/11 |
| 2024/0428448 | A1* | 12/2024 | Lin | .......................... G06T 7/74 |
| 2025/0078532 | A1* | 3/2025 | Zhao | ................... G06V 10/774 |

OTHER PUBLICATIONS

Chen et al. "PointLaneNet: Efficient end-to-end CNNs for Accurate Real-Time Lane Detection." 2019 IEEE Intelligent Vehicles Symposium (2019); pp. 2563-2568.
Qiao et al. "A Lane Recognition Based on Line-CNN Network." 2020 Asia-Pacific Conference on Image Processing, Electronics and Computers (2020); pp. 96-100.

* cited by examiner

Fig. 3

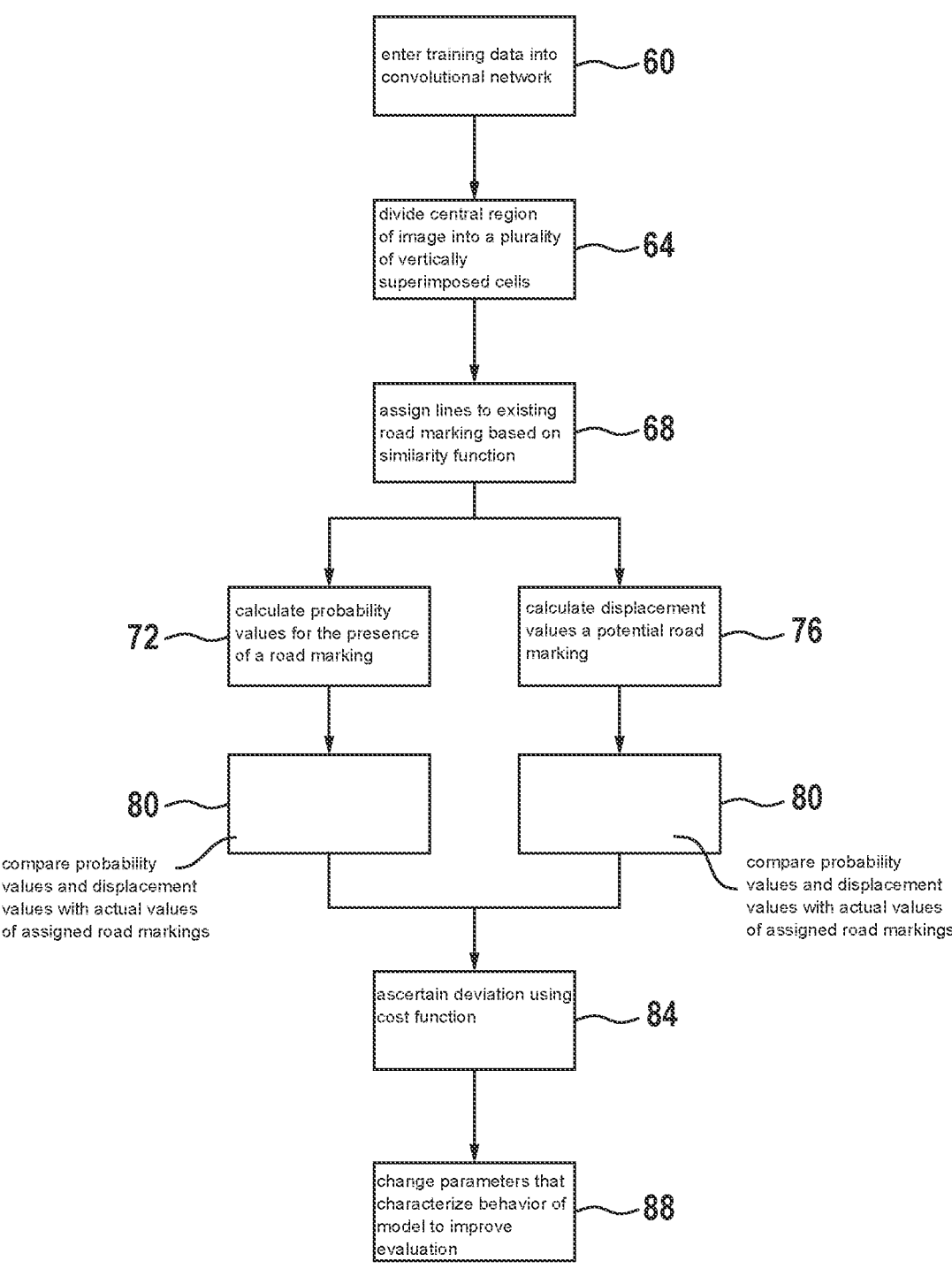

enter training data into
convolutional network — 60 divide central region
of image into a plurality
of vertically
superimposed cells — 64 assign lines to existing
road marking based on
similarity function — 68

72 — calculate probability
values for the presence
of a road marking calculate displacement
values a potential road
marking — 76

80 —

80 — compare probability
values and displacement
values with actual values
of assigned road markings compare probability
values and displacement
values with actual values
of assigned road markings ascertain deviation using
cost function — 84 change parameters that
characterize behavior of
model to improve
evaluation — 88

METHOD FOR RECOGNIZING HORIZONTAL ROAD MARKINGS

CROSS REFERENCE

The present application claims the benefit under 35 U.S.C. § 119 of German Patent Application No. DE 10 2023 200 575.1 filed on Jan. 25, 2023, which is expressly incorporated herein by reference in its entirety.

FIELD

The present invention relates to a method for recognizing horizontal road markings and determining the course thereof. Furthermore, the present invention also relates to a method for training a convolutional neural network for ascertaining a horizontal road marking and the course thereof.

BACKGROUND INFORMATION

In the course of increasing automation of vehicle functions, the recognition of lanes and other road markings is becoming ever more important. It is important here that different road markings be able to be recognized correctly and quickly by the vehicle.

German Patent Application No. DE 10 2004 057 188 A1 describes a device for assisting in the driving of a vehicle. The front scene of a vehicle is displayed as an image by a CCD camera. The number of image elements in each horizontal line required to drive the vehicle is stored, and it is determined whether the vehicle can drive past a parked vehicle on the basis of a ratio of the number of image elements of the road where no vehicle is parked in the image to the number of image elements of each horizontal line on the basis of the width of the vehicle.

European Patent Application No. EP 3 410 398 A1 describes a system for recognizing road information that is capable of determining the positions of lane markings on the other side of a lane after a lane change. The system comprises a means for recognizing a front lane marking, a means for recognizing a side lane marking, and a means for estimating the front lane markings located on the other side of the lane after a lane change.

An object underlying the present invention is to specify a method with which horizontal road markings can be recognized with reduced running time.

The object may be achieved by a method for recognizing horizontal road markings and determining the course thereof, with features of the present invention. The present invention further provides a method for training a convolutional neural network, having features of the present invention. Preferred embodiments of the present invention can be found in the disclosure herein.

SUMMARY

The present invention provides a method for recognizing horizontal road markings and determining the course thereof. According to an example embodiment of the present invention, the method comprises the steps of capturing an image of a road, and dividing a central region of the image into a plurality of vertically superimposed cells and assigning to each cell predefined lines that are variously aligned around a horizontal direction. The image is preferably captured by a camera of a vehicle. Since horizontal road markings, such as stop lines, etc., usually cross at least a central region of the image, a complete evaluation of the image is not necessary, so that the computational effort can be significantly reduced by a central evaluation only. The running time for such a method is shortened accordingly.

Since the horizontal road marking does not necessarily have to be shown horizontally in the image, lines that could correspond to the road marking are specified. Thus, the predefined lines are aligned around a horizontal direction. For example, the lines can be arranged in 10° steps between −30° and 30° to a horizontal direction. Thus, a road marking that is aligned more vertically would be completely different from the specified lines.

In a further step, at least one probability value for the presence of a road marking and displacement values of the line to the road marking are calculated for each line of each cell. A probability value is understood to be a value that indicates both whether a road marking is generally present and how similar such road marking is to the respective specified line. Thus, the different lines can be weighted using the probability value, so that a criterion is available according to which a decision can be made as to which line should be used to represent the road marking.

The displacement values are the values by which specified points on a line must be displaced in order to reach the road marking. Advantageously, a Euclidean distance between the line and the road marking is determined for the specified points, which corresponds to the displacement value. The displacement values are used to specify the amount by which the line must be displaced in order to reach the actual road marking.

The probability value and the displacement values are subsequently entered into a calculation function, and at least one line is output. The calculation function is, for example, an algorithm that, based upon the probability values and the displacement values, selects the line that most closely corresponds to the horizontal road marking. This line is the best starting point from which to arrive at the actual course of the road marking.

Finally, the course of the horizontal road marking is determined from the at least one line and the displacement values. Accordingly, the true course of the horizontal road marking is obtained by applying the displacement values to the line.

In a preferred embodiment of the present invention, the steps are carried out by means of a trained convolutional neural network. A trained convolutional neural network is used to create a generalized model on the basis of training examples. After training, such a network can be used to rapidly and easily detect the actual course of a horizontal road marking. This can be carried out continuously while driving.

In a further preferred embodiment of the present invention, at least one non-maximum suppression function is used for the calculation functions. With a non-maximum suppression function, all candidates for road markings are calculated from the displacement values and the line courses. A candidate with the highest probability value is subsequently selected. Based upon this candidate, a similarity to all other candidates is calculated. If the similarity of candidates is greater than a limit value, they are discarded. Starting with the next highest candidate, such steps are repeated for all remaining candidates until there are no more candidates. By assuming the highest probability in each case, several horizontal road markings can also be recognized in one image.

Preferably, when calculating the probability values for the presence of a road marking, a probability for the presence of a dashed road marking and/or a solid road marking is additionally calculated. Thus, various lines are recognized. As a result, it is possible, for example, to distinguish a zebra crossing or a pedestrian crossing from a stop line.

In an advantageous further development of the present invention, a probability as to whether the road marking is located on a road of the ego vehicle is additionally calculated. In particular, the lane in which the ego vehicle is traveling is understood to be the road. By calculating such a probability, it is possible to assess whether a horizontal road marking is relevant for the trajectory planning of the ego vehicle. As a result, horizontal road markings that are not on the road of the ego vehicle can be ignored.

Advantageously, a probability of other horizontal structures that are present is additionally determined. Horizontal structures are understood to be curbs, railroad barriers, etc. Since such structures are also shown in the image and are recognized by the method, a calculation of the probability can be used to distinguish such a horizontal structure from a road marking. This makes it easier to distinguish among different objects.

The present invention also provides a method for training a convolutional neural network for ascertaining a horizontal road marking and the course thereof. In a first step, training data comprising at least image data with at least one horizontal road marking with a known course are entered. Based upon the known training data, the network is trained until all road markings and courses can be predicted correctly. In the convolutional neural network, during training, a model is adapted until correct results are achieved. After training, it is then possible to use this model to determine the horizontal road markings and the course even with unknown image data.

According to an example embodiment of the present invention, in further steps, a central region of the image is divided into a plurality of vertically superimposed cells, and predefined lines that are variously aligned around a horizontal direction are assigned to each cell, and lines are assigned to the at least one existing road marking based upon a similarity function. Such steps correspond to the method for recognizing horizontal road markings, so that reference is made to the remarks regarding this method.

A probability value for the presence of a road marking and a displacement value of the line to a potential road marking is subsequently calculated for each line of each cell, and the probability values and the displacement values are compared with the actual values of the assigned road markings. Displacement values are only calculated if, according to the probability value, there is a road marking. Otherwise, no displacement values are calculated. When comparing the probability values and the displacement values with the actual values, a deviation between such values is calculated.

According to an example embodiment of the present invention, in the next step, such deviation is evaluated using a cost function. The cost function is a method for evaluating how well the convolutional neural network algorithm models the training data set.

Parameters that characterize the behavior of the model are changed, with the aim that further processing of training data by the convolutional neural network is expected to improve the evaluation by the cost functions, and enabling the ascertainment of the probability values and the displacement values if an ascertained accuracy factor reaches a predetermined value. An accuracy factor can be understood as a specified value or a limit value at which no further improvement can be achieved with further training.

The object of the present invention may be additionally achieved by a control device that is configured to carry out the method according to the present invention.

The method according to the present invention described above can, for example, be computer-implemented and thus embodied in software. The present invention therefore also relates to a computer program comprising machine-readable instructions that, when executed on one or more computers, cause the computer or computers to carry out the described method.

The present invention also relates to a machine-readable data carrier and/or to a download product having the computer program. A download product is a digital product that can be transmitted via a data network, i.e., can be downloaded by a user of the data network, and can, for example, be offered for immediate download in an online shop.

Such a computer program can be operated on one or more computers, which are arranged in a cloud, for example. The advantages mentioned regarding the method are achieved via such a computer operated in the cloud.

Exemplary embodiments of the present invention are illustrated in the figures and explained in more detail in the following description.

BRIEF DESCRIPTION OF THE DRAWINGS

FIG. 3 shows a representation of a method for training a convolutional neural network according to an exemplary embodiment of the present invention.

DETAILED DESCRIPTION OF EXAMPLE EMBODIMENTS

Figure 1:
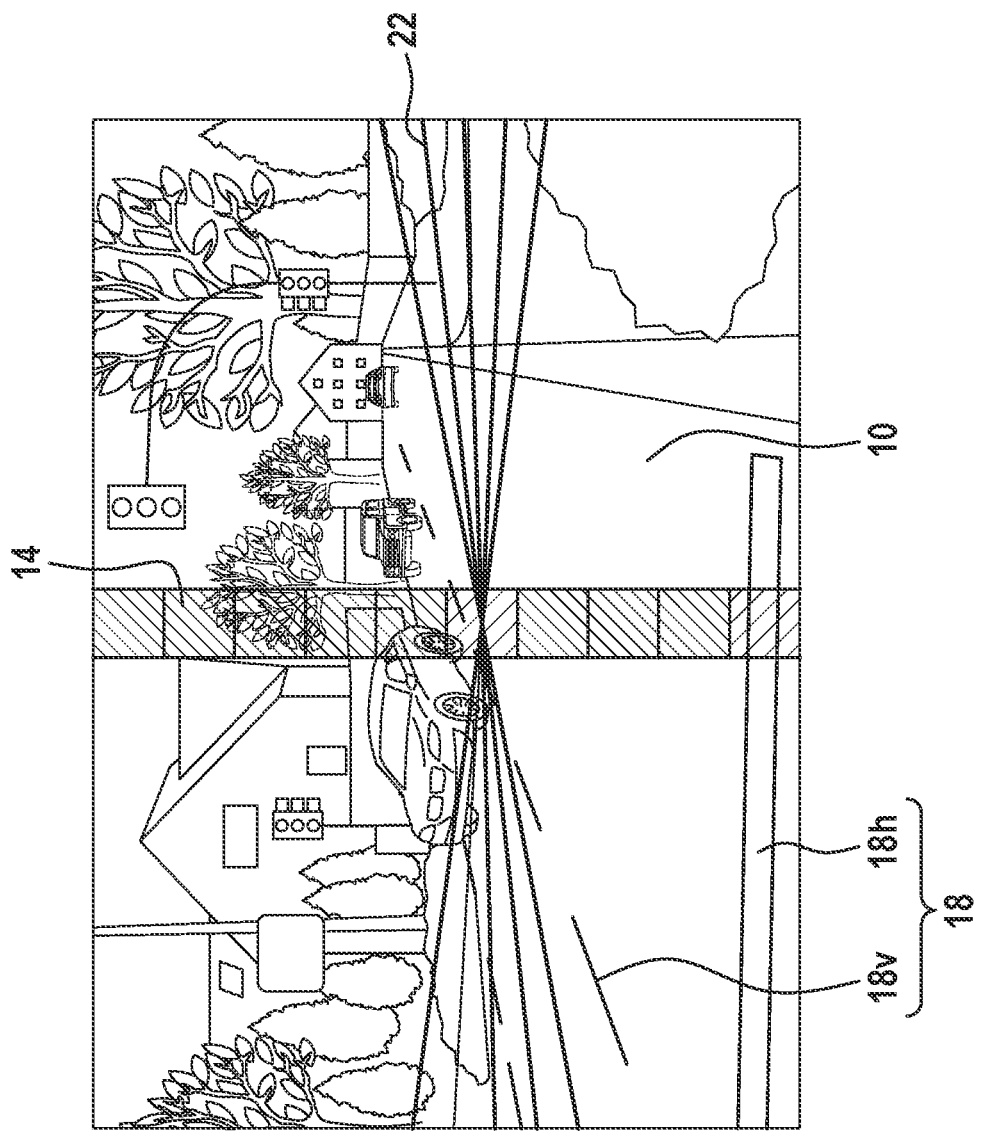
FIG. 1 shows an image of a road with vertically arranged cells and predefined lines, according to an example embodiment of the present invention.

FIG. 1 shows an image of a road 10. This image may have been recorded by a vehicle camera, for example. During the method for recognizing horizontal road markings and determining the course thereof, a central region of the image is divided into a plurality of vertically superimposed cells 14. During the evaluation of the image, only the road markings 18 shown in the cells 14 are evaluated.

As an example, a plurality of lines 22 variously aligned around a horizontal direction are arranged in a cell 14. Although such lines 22 are assigned to each cell 14, for the sake of clarity, such lines 22 are shown only in one cell 14. Since horizontal road markings 18h are to be recognized using this method, it is sufficient if the predefined lines 22 are arranged in the range between −30° and +30°. In the image, both a horizontal and a vertical road marking 18h, 18v are recognized in the cell 14. Although both road markings 18h, 18v are recognized, the vertical road marking 18v is discarded after calculating the probability values and the displacement values.

Figure 2:
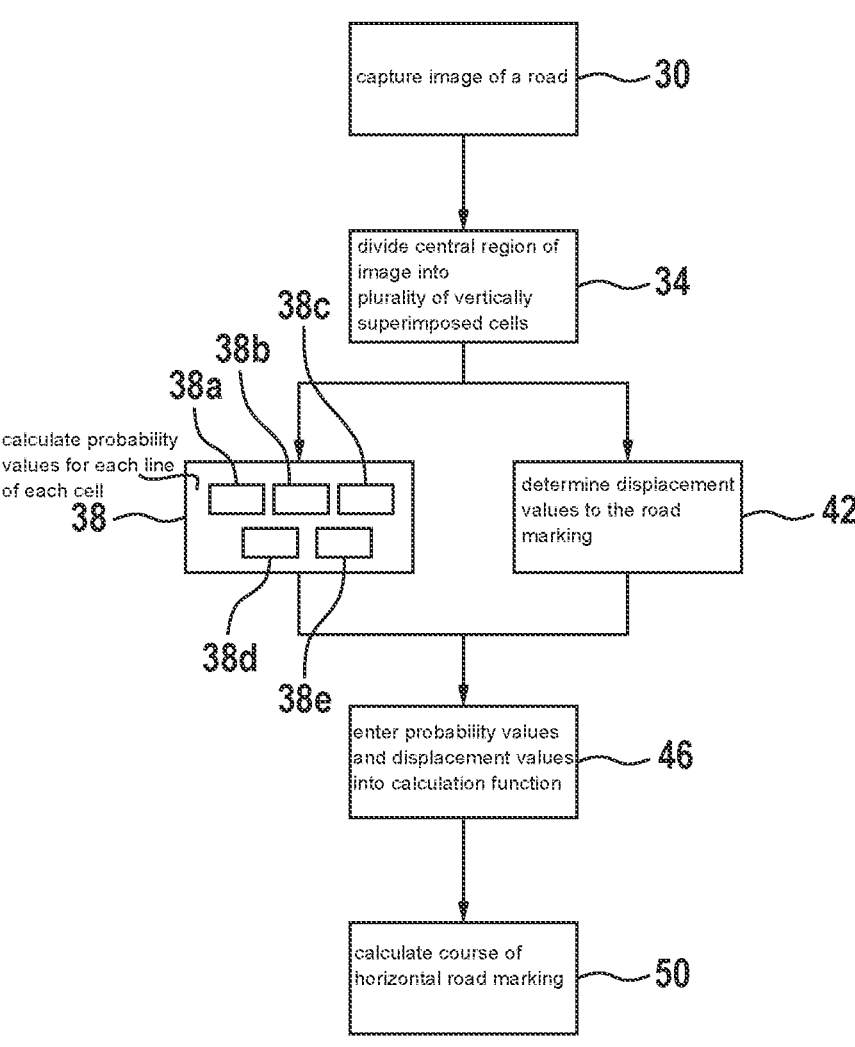
FIG. 2 shows a representation of a method for recognizing horizontal road markings and determining the course thereof according to an exemplary embodiment of the present invention.

FIG. 2 shows a representation of a method for recognizing horizontal road markings 18h and determining the course thereof according to an exemplary embodiment of the present invention. In a first step 30 of the method, an image of a road 10 is captured. In a next step 34, a central region of the image is divided into a plurality of vertically superimposed cells 14. This can be designed in accordance with FIG. 1. In addition, in this step 34, each cell 14 is assigned predefined lines 22 that are variously aligned around a horizontal direction. As shown in FIG. 1, such lines 22 have no end, but extend over the entire image. After displacement of such a line 22, a further course of the horizontal road marking 18*h* can thus be determined.

In step 38, probability values are calculated for each line 22 of each cell 14. The probability values comprise values for the presence of a road marking 18. As a further probability value, a value is output in each case as to whether a dashed road marking 38*b* or a solid road marking 38*c* is present. As a result, not only a horizontal road marking 18*h*, but also the type of horizontal road marking 18*h*, can be recognized.

In addition, in the method shown, a probability value as to whether the road marking 18 is located on a road 10 of the ego vehicle is calculated 38*d*. Such a probability value can also be used to make statements as to whether the road marking 18 is relevant for the ego vehicle. In the method, a probability value for horizontal structures is also determined 38*e*. As a result, it is possible to recognize such structures as well. This can also prevent incorrect assignment of a horizontal structure to a road marking 18. The recognition of road markings 18 is thereby improved.

At the same time, in step 42, displacement values to the road marking 18 are determined for each line 22, which indicate the value by which the line 22 must be displaced in order to reach the road marking 18. Each line 22 has at least two displacement values, via which the line can be both displaced in parallel and rotated.

In step 46, the probability values and the displacement values are entered into a calculation function. If at least one road marking 18 is present in the image of the road 10, at least one line 22 that is most similar to the road marking 18 is accordingly output. In a subsequent step 50, the course of the horizontal road marking 18*h* is calculated on the basis of the at least one line 22 and the displacement values. This is done by applying the displacement values to the line 22 so that the line 22 is mapped onto the horizontal road marking 18*h*.

FIG. 3 shows an illustration of a method for training a convolutional neural network according to an exemplary embodiment of the present invention. The convolutional neural network is trained with this method, so that this network can carry out the method shown in FIG. 2. In the first step 60, training data are entered into the convolutional neural network. The training data comprise image data with at least one horizontal road marking 18*h* with a known course.

As in FIG. 2, in step 64, a central region of the image is divided into a plurality of vertically superimposed cells 14. In addition, each cell 14 is assigned predefined lines 22 that are variously aligned around a horizontal direction. In step 68, lines 22 are assigned to at least one existing road marking 18 based upon a similarity function. Probability values for the presence of a road marking are subsequently calculated 72. Although it is not shown in FIG. 3, in this step 72, the probabilities for the presence of a dashed or solid road marking 18, and whether the road marking is on the road 10 of the ego vehicle, can also be calculated. In addition, displacement values for a potential road marking are calculated 76 for the lines 22.

In a further step 80, the probability values and the displacement values are compared with the actual values of the assigned road markings 18 from the training data. A deviation between the calculated and actual values is ascertained. Such deviation is evaluated in the next step 84 by means of a cost function. Subsequently, parameters that characterize the behavior of the model are changed, with the aim that further processing of training data by the convolutional neural network is expected to improve the evaluation by the cost functions 88. This is carried out accordingly until an ascertained accuracy factor for the ascertainment of the probability values and the displacement values reaches a predetermined value. This value is, advantageously, a limit value of a learning curve, after further runs have achieved no further or significant improvement.

What is claimed is:

1. A method for recognizing horizontal road markings and determining a course of the horizontal road marking, the method comprising the following steps:

capturing an image of a road;

dividing a central region of the image into a plurality of vertically superimposed cells and assigning to each cell of the cells predefined lines that are variously aligned around a horizontal direction;

calculating, for each line of each cell, at least one probability value for presence of a road marking and displacement values of the line to the road marking;

entering the probability values and the displacement values into a calculation function and outputting at least one line; and determining the course of the horizontal road marking from the at least one line and the displacement values.

2. The method according to claim 1, wherein the steps are carried out using a trained convolutional neural network.

3. The method according to claim 1, wherein at least one non-maximum suppression function is used for the calculation function.

4. The method according to claim 1, wherein, with the calculation of the probability values for the presence of a road marking, a probability for the presence of a dashed road marking and/or a solid road marking is additionally calculated.

5. The method according to claim 1, wherein a probability as to whether the road marking is located on a road of an ego vehicle is additionally calculated.

6. The method according to claim 1, wherein a probability of other horizontal structures present is additionally determined.

7. A method for training a convolutional neural network for ascertaining a horizontal road marking and a course of the horizontal road marking, comprising the following steps:

entering training data, including at least image data with at least one horizontal road marking with a known course;

dividing a central region of the image into a plurality of vertically superimposed cells and assigning to each cell of the cells predefined lines that are variously aligned around a horizontal direction;

assigning the lines to the at least one existing road marking based upon a similarity function;

calculating, for each line of each cell, a probability value for presence of a road marking and a displacement value of the line to a potential road marking;

comparing the probability values and the displacement values with actual values of the assigned road markings;

evaluating, based on the comparing, a deviation using a cost function; and changing parameters that characterize the behavior of the model, with an aim that further processing of training data by the convolutional neural network is expected to improve the evaluation by the cost function, and enabling the ascertainment of the probability values and the displacement values when an ascertained accuracy factor reaches a predetermined value.

8. A control unit of a motor vehicle configured to recognize horizontal road markings and determining a course of the horizontal road marking, the control unit configured to:

capture an image of a road;

divide a central region of the image into a plurality of vertically superimposed cells and assigning to each cell of the cells predefined lines that are variously aligned around a horizontal direction;

calculate, for each line of each cell, at least one probability value for presence of a road marking and displacement values of the line to the road marking;

enter the probability values and the displacement values into a calculation function and outputting at least one line; and determine the course of the horizontal road marking from the at least one line and the displacement values.

9. A non-transitory machine-readable data carrier on which is stored a computer program including machine-readable instructions for recognizing horizontal road markings and determining a course of the horizontal road marking, the instructions, when executed by one or more computers, causing the one or more computers to perform the following steps:

capturing an image of a road;

dividing a central region of the image into a plurality of vertically superimposed cells and assigning to each cell of the cells predefined lines that are variously aligned around a horizontal direction;

calculating, for each line of each cell, at least one probability value for presence of a road marking and displacement values of the line to the road marking;

entering the probability values and the displacement values into a calculation function and outputting at least one line; and determining the course of the horizontal road marking from the at least one line and the displacement values.

10. A computer equipped with a non-transitory machine-readable data carrier on which is stored a computer program including machine-readable instructions for recognizing horizontal road markings and determining a course of the horizontal road marking, the instructions, when executed by the computer, causing the computer to perform the following steps:

capturing an image of a road;

dividing a central region of the image into a plurality of vertically superimposed cells and assigning to each cell of the cells predefined lines that are variously aligned around a horizontal direction;

calculating, for each line of each cell, at least one probability value for presence of a road marking and displacement values of the line to the road marking;

entering the probability values and the displacement values into a calculation function and outputting at least one line; and determining the course of the horizontal road marking from the at least one line and the displacement values.

* * * * *